(12) United States Patent
Janssen et al.

(10) Patent No.: US 12,122,239 B2
(45) Date of Patent: Oct. 22, 2024

(54) PARALLEL HYBRID DRIVE FOR A MOTOR VEHICLE, MOTOR VEHICLE, AND METHOD FOR OPERATING A PARALLEL HYBRID DRIVE

(71) Applicant: Rheinisch-Westfälische Technische Hochschule (RWTH) Aachen, Aachen (DE)

(72) Inventors: Peter Janssen, Maasbracht (NL); Jakob Andert, Aachen (DE); Michael Engels, Aachen (DE)

(73) Assignee: Rheinisch-Westfälische Technische Hochschule (RWTH) Aachen, Aachen (DE)

( * ) Notice: Subject to any disclaimer, the term of this patent is extended or adjusted under 35 U.S.C. 154(b) by 0 days.

(21) Appl. No.: 18/010,409

(22) PCT Filed: Jun. 17, 2021

(86) PCT No.: PCT/EP2021/066463
§ 371 (c)(1),
(2) Date: Dec. 14, 2022

(87) PCT Pub. No.: WO2021/255188
PCT Pub. Date: Dec. 23, 2021

(65) Prior Publication Data
US 2023/0311635 A1    Oct. 5, 2023

(30) Foreign Application Priority Data

Jun. 17, 2020 (DE) .................. 10 2020 003 597.3

(51) Int. Cl.
*F16H 3/72* (2006.01)
*B60K 6/365* (2007.10)
(Continued)

(52) U.S. Cl.
CPC .............. *B60K 6/365* (2013.01); *B60K 6/383* (2013.01); *B60W 10/08* (2013.01); *B60W 10/11* (2013.01);
(Continued)

(58) Field of Classification Search
CPC .............. F16H 3/72; F16H 2200/2005; F16H 2200/0013; F16H 2200/2033;
(Continued)

(56) References Cited

U.S. PATENT DOCUMENTS

| 5,433,282 A | 7/1995 | Moroto | |
|---|---|---|---|
| 7,465,251 B2 * | 12/2008 | Zhang | B60K 6/365 475/5 |

(Continued)

FOREIGN PATENT DOCUMENTS

| CN | 105398324 A | * | 3/2016 |
|---|---|---|---|
| CN | 107697061 A | * | 2/2018 |

(Continued)

*Primary Examiner* — Roger L Pang
(74) *Attorney, Agent, or Firm* — Dinsmore & Shohl LLP

(57) ABSTRACT

Disclosed is parallel hybrid drive for a motor vehicle, a motor vehicle, a method for operating a parallel hybrid drive in an all-electric mode, a method for operating a parallel hybrid drive in a direct drive mode, and a method for operating a parallel hybrid drive in a CVT mode. The drive for a motor vehicle includes an electric machine operable as a motor and generator, an internal combustion engine, a drive axle, and an epicyclic gear. The epicyclic gear includes: a first shaft connected to the electric machine; a second shaft connected to the internal combustion engine; and a third shaft connected to the drive axle. A clutch element is configured to firmly connect at least two shafts of the epicyclic gear to each other. A first brake element is configured to prevent rotation of the internal combustion engine in one direction of rotation.

20 Claims, 4 Drawing Sheets

(51) Int. Cl.
*B60K 6/383* (2007.10)
*B60W 10/08* (2006.01)
*B60W 10/11* (2012.01)
*B60W 10/18* (2012.01)
*B62J 43/16* (2020.01)
*B62M 11/14* (2006.01)
*F02D 9/08* (2006.01)
*F02N 11/04* (2006.01)

(52) U.S. Cl.
CPC .............. *B60W 10/18* (2013.01); *B62J 43/16* (2020.02); *B62M 11/14* (2013.01); *F02D 9/08* (2013.01); *F02N 11/04* (2013.01); *F16H 3/72* (2013.01); *F16H 2200/0013* (2013.01); *F16H 2200/2005* (2013.01); *F16H 2200/2079* (2013.01)

(58) Field of Classification Search
CPC ..... F16H 2200/2035; F16H 2200/2038; F16H 2200/2066; F16H 2200/2079; B60W 10/08; B60W 10/11; B60W 10/18; B60K 6/365; B60K 6/383
USPC .............................. 475/5, 271, 293, 297, 258
See application file for complete search history.

(56) References Cited

U.S. PATENT DOCUMENTS

| | | | | |
|---|---|---|---|---|
| 2005/0181907 A1* | 8/2005 | Colvin | ................ | B60W 10/06 477/3 |
| 2009/0071733 A1* | 3/2009 | Duan | ................ | B60K 6/383 903/909 |
| 2012/0035014 A1* | 2/2012 | Moeller | ................ | B60K 6/445 475/5 |

FOREIGN PATENT DOCUMENTS

| | | | | |
|---|---|---|---|---|
| DE | 102004005349 A1 | 8/2005 | | |
| DE | 10049514 B4 | 9/2005 | | |
| DE | 102009019485 A1 | 6/2010 | | |
| DE | 102017214039 A1 | 2/2019 | | |
| EP | 941883 A2 * | 9/1999 | ............. | B60K 6/365 |
| EP | 1574379 A2 | 9/2005 | | |
| EP | 1314884 B1 | 9/2009 | | |
| JP | H0914385 A | 1/1997 | | |
| WO | WO-2008017436 A2 * | 2/2008 | ............. | B60K 25/02 |
| WO | 2018/046039 A1 | 3/2018 | | |

\* cited by examiner

PARALLEL HYBRID DRIVE FOR A MOTOR VEHICLE, MOTOR VEHICLE, AND METHOD FOR OPERATING A PARALLEL HYBRID DRIVE

CROSS-REFERENCE TO RELATED APPLICATIONS

This application is the U.S. National Stage of PCT/EP2021/066463 filed on Jun. 17, 2021, which claims priority to German Patent Application 102020003597.3 filed on Jun. 17, 2020, the entire content of both are incorporated herein by reference in their entirety.

FIELD OF THE INVENTION

The invention relates to a parallel hybrid drive for a motor vehicle, a motor vehicle, a method for operating a parallel hybrid drive in an all-electric mode, a method for operating a parallel hybrid drive in a direct drive mode, and a method for operating a parallel hybrid drive in a CVT (continuously variable transmission) mode with a stepless control range.

BACKGROUND OF THE INVENTION

A hybrid drive comprising a planetary gear, an internal combustion engine, an electric prime mover and two clutches is known from DE10049514B4.

The parallel hybrid drive for a motor vehicle according to the invention comprises
 an electric machine operable as a motor and a generator,
 an internal combustion engine,
 a drive axle,
 an epicyclic gear comprising
 a first shaft, which is connected to the electric machine,
 a second shaft which is connected to the internal combustion engine, and
 a third shaft, which is connected to the drive axle,
 a clutch element, which is configured to firmly connect at least two shafts of the epicyclic gear to each other, and
 a first brake element, which is configured to prevent rotation of the internal combustion engine in one direction of rotation.

Due to the first brake element being configured to prevent rotation of the internal combustion engine in one direction of rotation, the drive axle can be driven independently of the internal combustion engine by means of the electric machine. This enables a purely electric propulsion of the motor vehicle.

The first brake element can be configured, for example, to block rotation of the internal combustion engine in a backwards direction. The first brake element can be configured to fix an output shaft of the internal combustion engine to a housing of the hybrid drive. The first brake element can, for example, be configured to operate in a frictionally engaged or positive-locking manner. The first brake element can be configured to connect the output shaft to the housing in a rotationally fixed manner by actuation thereof. For example, the first brake element can be closed by actuation. A rotationally fixed connection can cause an equal rotational movement of the two connected components. Due to intentional or unintentional slippage, there may be a difference in rotational speed, but the rotational movements are still to be regarded as equal.

The first brake element can, for example, be configured to switch automatically. This can mean that the first brake element can close and open automatically. In contrast to an actively switchable brake element, this means that there is no need for respective actuators to actuate the first brake element, and actuation is performed automatically due to the operation of the hybrid drive, for example on the basis of respective states of the electric machine and the internal combustion engine. Thus, the hybrid drive can be compact and cost-effective. In addition, no manual actuation of the brake element is necessary. This simplifies operation of the motor vehicle.

The first brake element can be configured to automatically lock the output shaft of the internal combustion engine based on a first direction of rotation of the internal combustion engine. The first brake element can be configured to automatically release the output shaft of the internal combustion engine based on a second direction of rotation of the internal combustion engine opposite thereto. The first brake element can, for example, be configured as a freewheel, in particular as a roller freewheel. An example of a roller freewheel is a ball bearing which is configured to block rotation of a shaft mounted thereon in the first direction of rotation and to block rotation thereof in the opposite second direction of rotation.

The first brake element can alternatively or additionally be configured to be actively switched. For this purpose, the hybrid drive may comprise a brake actuation element. A purely actively switchable brake element can be simpler and less expensive than a purely automatically switching brake element, as it can be free of rotating parts or at least have fewer rotating parts. An actively switchable first brake element can enable recuperation by the electric machine in more states of the hybrid drive. For example, the actively switchable first brake element may also lock the second shaft. The actively switchable first brake element can be configured to prevent rotation of the internal combustion engine in both directions of rotation.

SUMMARY OF THE INVENTION

The output shaft of the internal combustion engine can be permanently connected to the second shaft in a rotationally fixed manner. For example, the output shaft of the internal combustion engine and the second shaft of the epicyclic gear can be formed in one piece or welded or screwed together. Thus, for example, the first brake element does not serve to disconnect or establish the connection between the internal combustion engine and the second shaft of the epicyclic gear.

The epicyclic gear can, for example, be configured as a planetary gear. The planetary gear may comprise only a single planetary gear set. The planetary gear set may be configured, for example, as a minus planetary gear set or as a plus planetary gear set. The planetary gear set may comprise a sun gear shaft, a carrier shaft, and a ring gear shaft. A set of planet gears may be rotatably mounted on the carrier shaft. Each planet gear may mesh with, for example, the sun gear shaft and the ring gear shaft. The hybrid drive may be free of brake elements other than those described herein and further clutch elements.

Preferably, the first shaft of the epicyclic gear is configured as a ring gear shaft, the second shaft of the epicyclic gear as a sun gear shaft and the third shaft of the epicyclic gear as a carrier shaft. This can result in favorable transmission ratios, especially since the electric machine usually operates most efficiently at higher rotational speeds and the internal combustion engine relatively thereto at lower rotational speeds.

Preferably, the parallel hybrid drive comprises a throttle valve control configured to set a torque of the internal combustion engine at a predefined rotational speed. A definition of the operating rotational speed is caused by means of the electric motor. Particularly preferably, the throttle valve control is configured directly mechanical.

Direct mechanical throttle valve control can be provided, for example, by a Bowden cable. The throttle valve control can comprise an actuating element. The actuating element may be directly mechanically connected to the throttle valve of the internal combustion engine for adjusting the throttle valve. For example, the actuating element may be configured as a twist grip of a handlebar of a motor scooter, which comprises the hybrid drive. The actuating element may be configured to adjust a torque generated by the internal combustion engine, for example by controlling an air supply to the internal combustion engine. For this purpose, the actuating element may be connected to the throttle valve by means of the Bowden cable in the case of the directly mechanically configured throttle valve control. For example, a torque generated by the internal combustion engine can be adjusted by a driver by actuating the actuating element.

Thus, in contrast to an electrically controlled throttle valve, a signal monitoring can be simplified or even dispensed with entirely. Moreover, no redundancy and plausibility checks are required for throttle valve control in order to meet functional safety requirements.

The electric machine can, for example, be configured to be rotational speed controlled. The electric machine can comprise an inverter by means of which a rotational speed and/or a torque output of the electric machine can be adjusted.

The electric machine can also be controlled by means of the actuating element. For example, the actuating element can comprise a sensor which is configured to detect a position of the actuating element. This position can be transmitted to the inverter. The inverter can be configured to control the electric machine based on the detected position of the inverter.

The hybrid drive can be particularly simple and cost-effective if the actuating element of the throttle valve control is also configured to control the electric machine. For example, by means of the twist grip of the motor scooter, a throttle valve position can be adjusted proportionally to a rotational position of the twist grip and a control signal for the electric machine can be generated. Thus, electrical control of the electric machine can also be simple.

Preferably, the parallel hybrid drive comprises an energy storage device configured to supply the electric machine with electric energy and to be charged by the electric machine, and a second brake element configured to block the drive axle during a stationary charging operation of the energy storage device. Preferably, the second brake element is a wheel brake. The second brake element can form a driving brake of the motor vehicle. As a result, a brake element number may be small and may be limited to two or three brake elements, for example. In the case of three brake elements, a third brake element may be configured to brake a non-driven axle of the motor vehicle, which is configured, for example, as a front axle. During driving, the second brake element and optionally the third brake element can decelerate a driving speed of the motor vehicle. For this purpose, the second brake element and optionally the third brake element can be actuated by the driver of the motor vehicle. The actuation of the second brake element and the third brake element can be coupled to one another, so that only one joint actuation is ever possible. Operation of the internal combustion engine with the drive axle braked enables stationary charging of the energy storage device.

Furthermore, operation of the electric machine with the drive axle braked enables the internal combustion engine to be started from a standstill. For this purpose, the second brake element can be configured to be persistently adjusted into a closed state by an actuation. For example, the second brake element can be configured to be persistently closed in the manner of a hand brake.

The hybrid drive can therefore be configured to charge the energy storage device by driving the electric machine with the internal combustion engine. Alternatively or additionally, the hybrid drive can also be configured to charge the energy storage device by decelerating the motor vehicle with the electric machine. The energy storage device can be electrically connected to the electric machine via the inverter.

The hybrid drive can comprise a charge control. The charge control may be formed as part of the electric machine. The charge control may be formed by or comprise the inverter. The charge control may be configured to control the electric machine based on a state of charge of the energy storage device. For example, the charge control system can automatically cause charging of the energy storage device during a drive with the motor vehicle or reduce a rotational speed and/or a power output of the electric motor if the state of charge falls below a threshold value. The charge control may be configured to modify the control of the electric machine based on the position of the actuator according to the state of charge of the energy storage device. For example, the charge control can modify a characteristic curve of the electric machine that specifies its rotational speed relative to the position of the actuating element, in particular by a shifting. As a result, the hybrid drive control is very simple, robust, and of low complexity. At a low state of charge, an overall torque of the hybrid drive may be reduced compared to a high state of charge. However, the driver can intuitively and easily compensate for this by an adjusted actuation. For example, the driver can further rotate the twist grip of the scooter toward a higher drive output to achieve a desired power output even at a low state of charge. Compared to a high state of charge, a greater proportion of the power is then provided by the internal combustion engine. No complex feedback control system needs to be provided for this purpose, for example; instead, direct mechanical throttle valve control allows the driver to compensate accordingly through his supervision. In this way, it can also be ensured, for example, that sufficient residual charge remains to be able to start the internal combustion engine again with the electric machine even after the end of the drive. In addition, the energy storage device can also be used to supply power to other systems of the motor vehicle without the risk of their failure due to the energy storage device being completely drained by the electric machine.

The hybrid drive can comprise a charging device that is configured to charge the energy storage device with an energy source external to the vehicle. For example, the charging device can enable charging of the energy storage device by connecting it to a national power grid.

By connecting the at least two shafts of the epicyclic gear by means of the clutch element, the epicyclic gear can be locked. The sun gear shaft, the carrier shaft and the ring gear shaft of a locked epicyclic gear rotate at the same speed. Accordingly, the planetary gears no longer roll with their splines on the sun gear shaft and the ring gear shaft so that the epicyclic gear has a very high efficiency in the locked state. Preferably, the clutch element is configured to connect the third shaft of the epicyclic gear to the first shaft or the second shaft of the epicyclic gear.

The clutch element can, for example, be configured to switch automatically. In contrast to an actively switchable clutch element, there is thus no need for actuators to operate the clutch element. Thus, the hybrid drive can be compact and cost-effective. In addition, manual actuation of the clutch element is not necessary. This simplifies operation of the motor vehicle.

The clutch element can be configured to switch based on a rotational speed of the third shaft of the epicyclic gear. For this purpose, the clutch element may be connected to the third shaft on one side, for example. During shifting, a connection between the two shafts of the planetary gear can be established or disconnected. The rotational speed of the third shaft of the epicyclic gear can correspond to the rotational speed of the drive axle and thus to a driving speed of the vehicle. The clutch element can be configured to connect the at least two shafts of the epicyclic gear to each other when the speed of the third shaft of the epicyclic gear exceeds a threshold rotational speed. Thus, the hybrid drive can be automatically shifted to the locked state starting from a certain driving speed and thus operate particularly efficiently at high speeds. In addition, particularly high performance can be achieved by adding drive forces in the epicyclic gear, which can enable a particularly high driving speed. Due to the efficient power transmission in the epicyclic gear, the hybrid drive can potentially provide more power to the respective driven shafts compared to conventional drives with the same motors.

The automatic clutch element can be configured as a centrifugal clutch, for example. The clutch element is configured, for example, as a friction clutch. The clutch element can be configured to connect at least two shafts to one another in a rotationally fixed manner by actuation of the clutch element.

Preferably, the first brake element and the clutch element each are configured to shift automatically. This means that the driver of the motor vehicle does not need to shift the transmission, making the motor vehicle extremely easy to operate. For example, the driver only has to steer, control the power output from both engines by a common actuating element, and brake if necessary. For example, further activities are not necessary for controlling the drive over its entire possible speed range, in particular for driving the motor vehicle.

The motor vehicle according to the invention is configured as a motorcycle. It comprises a parallel hybrid drive according to the invention and a rear wheel driven by the hybrid drive. An example of a motorcycle is a motor scooter. Due to its compact and cost-effective design, the hybrid drive is also very suitable for other small vehicles, such as snowmobiles, quads or buggies. In contrast to a power transmission by means of a belt, the hybrid drive can, for example, save up to 25% fuel and/or, if necessary, provide a higher drive power. The parallel hybrid drive can also be configured as a pump drive.

The internal combustion engine can, for example, be configured as a two-stroke engine or a four-stroke engine. The electric machine can be configured to convert electric power into mechanical power. The electric machine can be configured as an AC motor, for example.

The method according to the invention for operating a parallel hybrid drive with an epicyclic gear in a direct drive mode comprises the steps:

Driving a first shaft of the epicyclic gear with an electric machine;

Driving a second shaft of the epicyclic gear with an internal combustion engine;

Transmission of movements of the first shaft and the second shaft to a third shaft of the epicyclic gear, wherein at least two shafts of the epicyclic gear are fixedly connected to one another by means of a closed clutch element.

Due to the at least two shafts of the epicyclic gear being firmly connected to each other conversion losses in the epicyclic gear can be avoided. The torques of the electric machine and the internal combustion engine are added in this mode. As described above, this mode is particularly suitable for high driving speeds.

The method according to the invention for operating a parallel hybrid drive with an epicyclic gear in an all-electric mode comprises the steps:

Driving a first shaft of the epicyclic gear with an electric machine;

Preventing a backwards rotation of an internal combustion engine connected to a second shaft of the epicyclic gear by means of a first brake element;

Transmission of a movement of the first shaft to a third shaft of the epicyclic gear.

It is thus possible, for example, to drive off in the morning without waking local residents. The internal combustion engine can be configured to start automatically when the speed threshold is exceeded. For example, the internal combustion engine can be switched on automatically when a speed of residential streets is exceeded in order to then be able to provide more power and even higher driving speeds. If the clutch element is configured to switch automatically, the internal combustion engine can be started automatically when the switching rotational speed is exceeded, for example due to the inertia of the hybrid drive.

The method according to the invention for operating a parallel hybrid drive with an epicyclic gear in a CVT mode comprises the steps:

Driving a first shaft of the epicyclic gear with an electric machine;

Driving a second shaft of the epicyclic gear with an internal combustion engine;

Transmission of movements of the first shaft and the second shaft to a third shaft of the epicyclic gear, wherein all shafts of the epicyclic gear are rotatable relative to each other.

The operating rotational speed of the internal combustion engine can depend on the rotational speed of the electric machine for a given speed in this mode. This enables rotational speed control of the internal combustion engine by the electric machine.

Further advantageous embodiments of the invention are also disclosed.

BRIEF DESCRIPTION OF THE DRAWINGS

Preferred embodiments are explained in more detail with reference to the following figures. Here shows

DETAILED DESCRIPTION OF THE INVENTION

Figure 1:
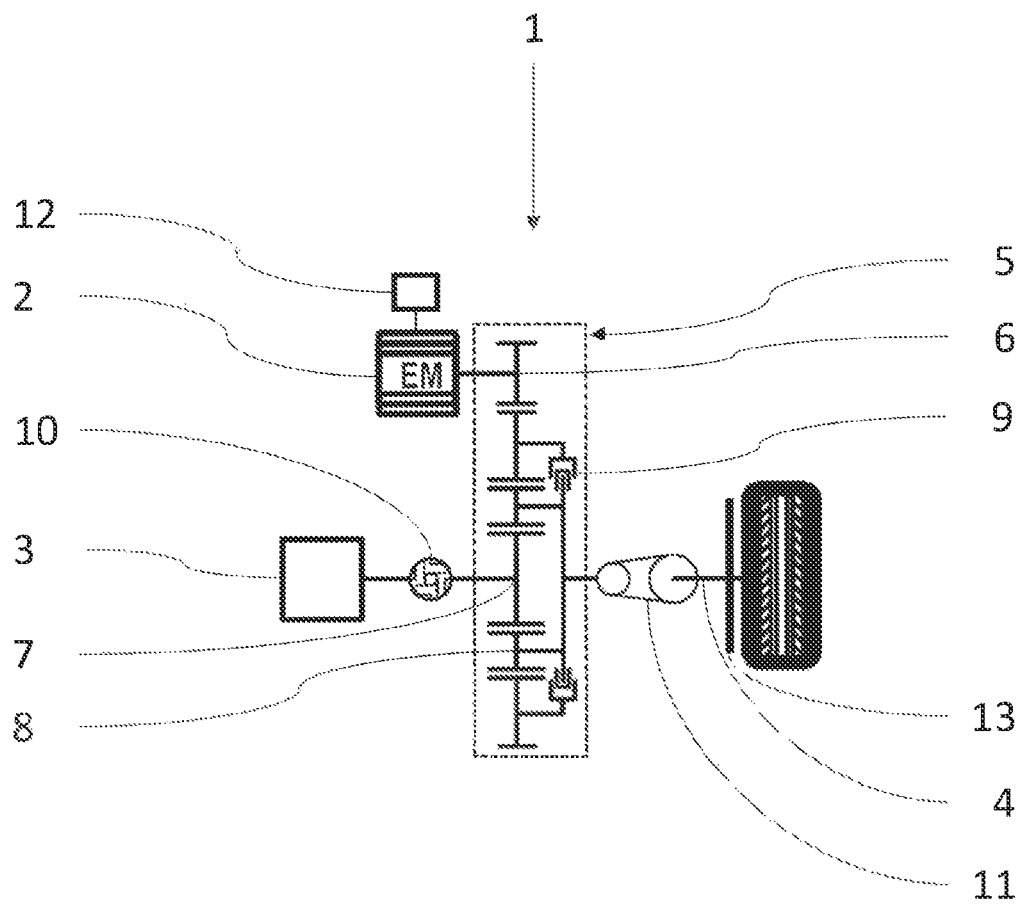
FIG. 1 is an example of a parallel hybrid drive for a motor vehicle according to the invention.

The parallel hybrid drive 1 shown in FIG. 1 is part of a motor scooter (not shown) and configured to drive a rear wheel of the motor scooter. For this purpose, the hybrid drive 1 comprises an electric machine 2 and an internal combustion engine 3. The electric machine is an electric motor 2, which can also be operated as a generator. The internal combustion engine is a four-stroke reciprocating engine 3.

Furthermore, the hybrid drive 1 comprises a traction battery 12, which is configured to supply the electric motor 2 with electrical energy and to be charged by the latter.

The electric motor 2 and the internal combustion engine 3 are connected to each other by an epicyclic gear 5. The epicyclic gear 5 comprises a first shaft 6, which is configured as a ring gear shaft, a second shaft 7, which is configured as a sun gear shaft, and a third shaft 8, which is configured as a carrier shaft. In the exemplary embodiment, the first shaft 6 is connected to the electric motor 2 and the second shaft 7 is connected to the internal combustion engine 3. The third shaft 8 of the epicyclic gear 5 is connected to a drive axle 4 of the motor scooter via a chain 11. In other embodiments, the third shaft 8 can also be connected to the drive axle 4 directly or by means of a spur drive.

Furthermore, the hybrid drive 1 comprises a clutch element 9. In the exemplary embodiment, the clutch element is configured as a centrifugal clutch 9, which is opened at speeds of the motor scooter below 30 km/h. When the centrifugal clutch 9 is open, a rotational speed of the internal combustion engine 3 can be controlled by the electric motor 2 by means of the connection between the two motors 2, 3 via the epicyclic gear 5. The rotational speed of the combustion engine 3 can thus be varied continuously in a lower speed range of the motor scooter.

Furthermore, the hybrid drive 1 comprises a throttle valve control (not shown), which is configured to set a torque transferred to the third shaft 8 from the internal combustion engine 3 at a speed specified by the electric motor 2. The throttle valve control used in the exemplary embodiment enables purely mechanical load control of the internal combustion engine 3 without electronic components.

At scooter speeds above 30 km/h, the centrifugal clutch 9 is closed and firmly connects the first shaft 6 and the third shaft 8. When the centrifugal clutch 9 is closed, all shafts 6, 7, 8 of the epicyclic gear 5 rotate at the same speed. This enables motor support of the internal combustion engine 3 by the electric motor 2. The fixed connection between the shafts enables direct drive without conversion losses in the epicyclic gear.

Furthermore, the hybrid drive 1 comprises a first brake element 10. In the exemplary embodiment, the first brake element is a roller freewheel 10, which is arranged between the internal combustion engine 3 and the second shaft 7. The freewheel 10 is configured to prevent backwards rotation of the internal combustion engine 3. As a result, a torque for driving the scooter can be controlled by the electric motor 2 and, when the centrifugal clutch 9 is open, can be transmitted to the drive axle 4 independently of the internal combustion engine 3. This enables purely electric operation of the scooter.

Furthermore, the hybrid drive 1 comprises a second brake element 13, which is configured to brake the drive axle 4. In the exemplary embodiment, the second brake element is a wheel brake 13. By operating the internal combustion engine 3 and simultaneously blocking the drive axle 4 by means of the wheel brake 13, a mechanical energy is transmitted from the internal combustion engine 3 to the electric motor 2 via the epicyclic gear 5. The electric motor 2 converts the mechanical energy into an electric energy in a working machine operation. This allows the traction battery 12 to be charged in a stationary manner independent of external power sources. Furthermore, this arrangement enables the internal combustion engine 3 to be started from a standstill by means of the electric motor 2. To start the internal combustion engine 3 from a standstill, the torque required for starting is provided by the electric motor 2 and supported at the wheel brake 13.

Different operating modes of the parallel hybrid drive are explained below.

Figure 2:
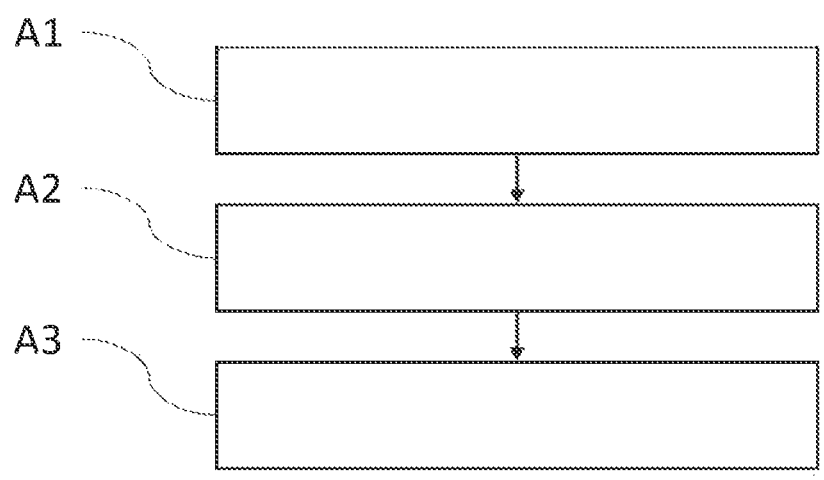
FIG. 2 is an example of a method according to the invention for operating the parallel hybrid drive in a direct drive mode.

An embodiment of a method according to the invention for operating the parallel hybrid drive 1 in a direct drive mode is shown in FIG. 2. In this mode, the centrifugal clutch 9 is closed. All shafts of the epicyclic gear are fixed to each other. In a first step of the method A1, the first shaft 6 of the epicyclic gearbox 5 is driven by the electric motor 2. In a second step A2, the second shaft 7 of the epicyclic gear 5 is driven by the internal combustion engine 3. In a third step A3, the movements of the first shaft 6 and the second shaft 7 are transmitted to the third shaft 8 of the epicyclic gear 5. This causes the torques of the motors 2, 3 to be added, resulting in high wheel torques. Since all wheels of the epicyclic gear 5 are firmly connected to each other by the closed centrifugal clutch 9, no significant conversion losses occur in the epicyclic gear 5. Compared to conventional drives with friction-loss gears, the parallel hybrid drive 1 in direct-drive mode exhibits higher overall efficiency. As a result, fuel can be saved during vehicle operation. Steps A1 to A3 are carried out simultaneously in the method described.

Figure 3:
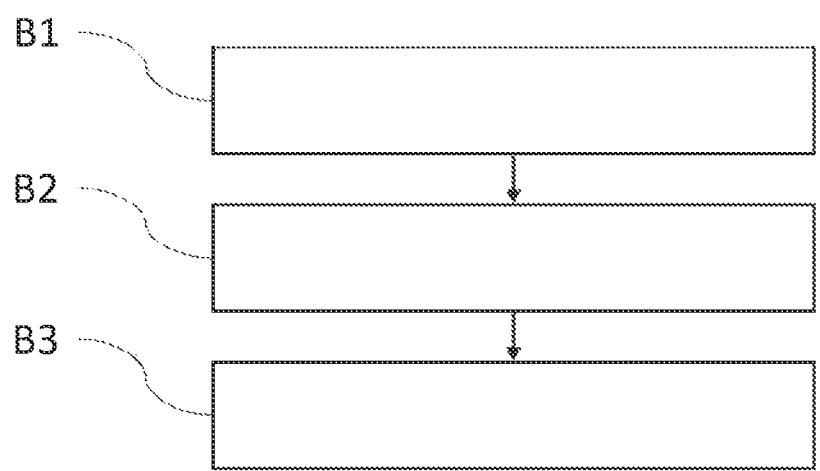
FIG. 3 is an example of a method according to the invention for operating the parallel hybrid drive in an all-electric mode.

Furthermore, the parallel hybrid drive 1 can be operated in an all-electric mode using a method according to the invention. An embodiment of the method is shown in FIG. 3. In this mode, the centrifugal clutch 9 is open. In a first step of the method B1, the first shaft 6 of the epicyclic gear 5 is driven by the electric motor 2. In a second step B2, a backwards rotation of the internal combustion engine 3 is prevented by means of the freewheel 10. In a third step of the method B3, a movement of the first shaft 6 is transmitted to a third shaft 8 of the epicyclic gear 5. In the exemplary embodiment, this results in a purely electric drive of the rear wheel of the motor scooter. Steps B1 to B3 are carried out simultaneously in the method described.

Figure 4:
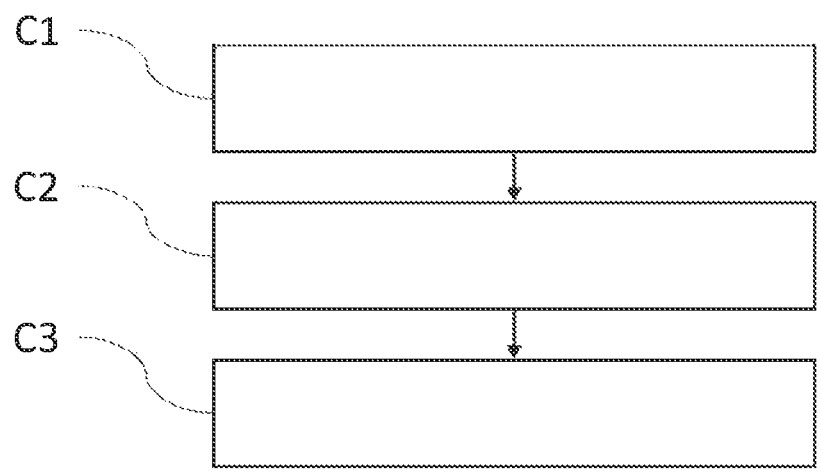
FIG. 4 is an example of a method according to the invention for operating the parallel hybrid drive in a CVT mode.

Furthermore, the parallel hybrid drive 1 can be operated in a CVT mode using a method according to the invention. An exemplary embodiment of the method is shown in FIG. 4. In this mode, the centrifugal clutch 9 is open. All wheels of the epicyclic gear 5 are rotatable against each other. In a first step of the method C1, the first shaft 6 of the epicyclic gear 5 is driven by the electric motor 2. In a second step C2, a second shaft 7 of the epicyclic gear 5 is driven by an internal combustion engine 3. In a third step C3, movements of the first shaft 6 and the second shaft 7 are transmitted to a third shaft 8 of the epicyclic gear 5. Steps C1 to C3 are carried out simultaneously in the method described. The rotational speed of the internal combustion engine 3 can be adjusted in the method by controlling the rotational speed of the electric motor 2. This enables stepless operation in which the power drawn from or supplied to the battery 12 can be adapted to its state of charge. The use of starting elements, such as friction clutches or converters, can be dispensed with. This reduces losses during start-up processes compared with conventional drives with start-up elements.

The invention claimed is:

1. Motor vehicle with a parallel hybrid drive for a motor vehicle, the hybrid drive comprising:
an electric machine operable as a motor and a generator;
an internal combustion engine;
a drive axle;
an epicyclic gear comprising:
a first shaft which is connected to the electric machine;
a second shaft which is connected to the internal combustion engine; and
a third shaft, which is connected to the drive axle;
a first clutch element which is a centrifugal clutch, configured to firmly connect at least two shafts of the epicyclic gear to each other and configured to switch automatically based on a rotational speed of the third shaft of the epicyclic gear; and
a first brake element which is designed to prevent rotation of the internal combustion engine in one direction of rotation, wherein:
the engine is started by the electric motor with the first clutch disengaged.

2. The motor vehicle according to claim 1, wherein the first brake element is configured to switch automatically, and wherein the first brake element is configured as a freewheel.

3. The motor vehicle according to claim 1, wherein the first shaft is a ring gear shaft, the second shaft is a sun gear shaft, and the third shaft is a carrier shaft.

4. The motor vehicle according to claim 1, wherein the electric machine is configured to control a rotational speed of the internal combustion engine when the clutch element is open.

5. The motor vehicle according to claim 1, further comprising a throttle valve control configured to adjust a torque transferred to the third shaft from the internal combustion engine at a speed specified by the electric machine.

6. The motor vehicle according to claim 5, wherein the throttle valve control is configured as directly mechanical.

7. The motor vehicle according to claim 1, further comprising an energy storage device configured to supply the electric machine with electric energy and to be charged by the electric machine, and a second brake element configured to block the drive axle during a stationary charging operation of the energy storage device.

8. The motor vehicle according to claim 7, wherein the electric machine is configured to start the internal combustion engine from a standstill when the drive axle is blocked.

9. The motor vehicle comprising the parallel hybrid drive according to claim 1, wherein the motor vehicle is configured as a motorcycle and wherein a rear wheel of the motor vehicle can be driven by the parallel hybrid drive.

10. The motor vehicle according to claim 1, wherein the first clutch firmly connects the third shaft and first shaft.

11. Motor vehicle with a parallel hybrid drive for a motor vehicle, the hybrid drive comprising: an electric machine operable as a motor and a generator; an internal combustion engine; a drive axle; an epicyclic gear comprising: a first shaft which is fixedly connected to the electric machine; a second shaft which is connected to the internal combustion engine; and a third shaft, which is connected to the drive axle; a first clutch element which is a centrifugal clutch, configured to firmly connect at least two shafts of the epicyclic gear to each other and configured to switch automatically based on a rotational speed of the third shaft of the epicyclic gear; and a first brake element which is designed to prevent rotation of the internal combustion engine in one direction of rotation, wherein: the first clutch firmly connects the third shaft and first shaft.

12. The motor vehicle according to claim 11, wherein at least one of:
the first brake element is configured to switch automatically, and wherein the first brake element is configured as a freewheel;
the first shaft is a ring gear shaft, the second shaft is a sun gear shaft, and the third shaft is a carrier shaft; and
the electric machine is configured to control a rotational speed of the internal combustion engine when the clutch element is open.

13. The motor vehicle according to claim 11, further comprising: a throttle valve control configured to adjust a torque transferred to the third shaft from the internal combustion engine at a speed specified by the electric machine; or an energy storage device configured to supply the electric machine with electric energy and to be charged by the electric machine, and a second brake element configured to block the drive axle during a stationary charging operation of the energy storage device.

14. The motor vehicle according to claim 11, further comprising: a throttle valve control configured to adjust a torque transferred to the third shaft from the internal combustion engine at a speed specified by the electric machine, wherein the throttle valve control is configured as directly mechanical; or an energy storage device configured to supply the electric machine with electric energy and to be charged by the electric machine, and a second brake element configured to block the drive axle during a stationary charging operation of the energy storage device, wherein the electric machine is configured to start the internal combustion engine from a standstill when the drive axle is blocked.

15. The motor vehicle comprising the parallel hybrid drive according to claim 11, wherein the motor vehicle is configured as a motorcycle and wherein a rear wheel of the motor vehicle can be driven by the parallel hybrid drive.

16. Motor vehicle with a parallel hybrid drive for a motor vehicle, the hybrid drive comprising:
an electric machine operable as a motor and a generator;
an internal combustion engine;
a drive axle;
an epicyclic gear comprising:
a first shaft which is connected to the electric machine;
a second shaft which is connected to the internal combustion engine; and
a third shaft, which is connected to the drive axle;
a first clutch element which is a centrifugal clutch, configured to firmly connect at least two shafts of the epicyclic gear to each other and configured to switch automatically based on a rotational speed of the third shaft of the epicyclic gear; and
a first brake element which is designed to prevent rotation of the internal combustion engine in one direction of rotation, wherein:
the electric machine is configured to control a rotational speed of the internal combustion engine when the clutch element is open.

17. The motor vehicle according to claim 16, wherein at least one of:
the first brake element is configured to switch automatically, and wherein the first brake element is configured as a freewheel; and
the first shaft is a ring gear shaft, the second shaft is a sun gear shaft, and the third shaft is a carrier shaft.

18. The motor vehicle according to claim 16, further comprising: a throttle valve control configured to adjust a torque transferred to the third shaft from the internal combustion engine at a speed specified by the electric machine;

or an energy storage device configured to supply the electric machine with electric energy and to be charged by the electric machine, and a second brake element configured to block the drive axle during a stationary charging operation of the energy storage device.

19. The motor vehicle according to claim 16, further comprising: a throttle valve control configured to adjust a torque transferred to the third shaft from the internal combustion engine at a speed specified by the electric machine, wherein the throttle valve control is configured as directly mechanical; or an energy storage device configured to supply the electric machine with electric energy and to be charged by the electric machine, and a second brake element configured to block the drive axle during a stationary charging operation of the energy storage device, wherein the electric machine is configured to start the internal combustion engine from a standstill when the drive axle is blocked.

20. The motor vehicle comprising the parallel hybrid drive according to claim 16, wherein the motor vehicle is configured as a motorcycle and wherein a rear wheel of the motor vehicle can be driven by the parallel hybrid drive.

* * * * *